Patented June 15, 1954

2,681,317

UNITED STATES PATENT OFFICE 2,681,317

METHOD OF PREPARING A COATING COMPOSITION CONTAINING A WATER SOLUBLE FLUORESCENT DYE

Harold Grossman, Montclair, N. J.

No Drawing. Application April 28, 1949,
Serial No. 90,277

5 Claims. (Cl. 252—301.2)

This invention relates to coating compositions containing fluorescent dyes or other fluorescent materials and especially to such compositions as inks which are adapted to be transferred to a supporting surface by lithography, silk-screening, and similar processes. However, the compositions are not necessarily limited to such particular applications.

Fluorescent dyes have been used for many years in applications to wigs and other theatrical properties and in plastics in order to produce desired effects under the action of ultraviolet or so-called "black" light. Such fluorescent materials have also been used in inks with similar effect, but the procedures employed in preparing the compositions are difficult and expensive.

It is the object of the present invention to provide an improved method of preparing coating compositions including fluorescent materials and improved products prepared by such methods.

Other objects and advantages of the invention will be apparent as it is better understood by reference to the following specification, in which the preferred embodiments of the invention are described.

It has been suggested heretofore that the fluorescent material employed in producing coating compositions should be dissolved in a volatile solvent such as ethyl alcohol in order to permit eventual combination of the fluorescent material with resins and oils which constitute the body of the ink vehicle. I have discovered that the use of volatile solvents such as ethyl alcohol is unnecessary and can be avoided. Colloidal dispersions of all the necessary ingredients can be prepared and combined, and the fluorescent material can be transferred from the water to the oil phase without difficulty to provide suitable compositions having the desired characteristics.

In the preferred embodiment of my invention, I select a fluorescent dye which is soluble in water. A considerable number of such dyes in various colors are commercially available and well known. Among the available dyes are Rhodamine B
Rhodamine 6-G
Auramine
Sulfo Flavin FS
Uramine SM.

A suitable drying oil is selected, for example linseed oil, soy bean oil, tung or China-wood oil, Perilla, hydrogenated castor oil or menhaden oil. I prefer to use a vegetable oil such as boiled linseed oil, but other drying oils are suitable. The selected oil is dispersed in water containing a dispersing agent such as ammonium linoleate. A small amount of ammonium hydroxide in the water will react with the oil to provide ammonium linoleate as the dispersing agent. Dispersing agents are well known, and others may be used in place of ammonium linoleate.

As the resin, I use dewaxed shellac. The resin, e. g. shellac, is dispersed in water containing a small amount of ammonium hydroxide which reacts with the acid shellac to produce a compound which is dispersible in water. Triethanolamine or other similar bases may be used in place of ammonium hydroxide.

To improve the covering properties, it is desirable to employ a filler or pigment. Many such materials are available, but I prefer a soft material such as aluminum stearate, which is available commercially in a water dispersion, alumina gel, finely divided silica, calcium carbonate, or barium carbonate.

Also, although it is not essential, I may add an agent such as dioctyl phthalate to the resin dispersion.

It will be noted that water is the medium used in preparing the several dispersions including the fluorescent material, the oil, the resin and the filler or pigment, although only the fluorescent material is soluble in water. No volatile solvent such as ethyl alcohol is necessary or desirable. When the several dispersions have been prepared, they are mixed in a suitable receptacle and thoroughly stirred. I then add an electrolyte such as hydrochloric acid which coagulates the colloids and causes the dispersions to break. The dispersed materials are thus transferred from the water to the oil phase. The oil phase is then filtered from the released water and dried. The product is ready for use. It may be thinned, if necessary, by adding more of the drying oil or an oil solvent such as turpentine.

The oil can also be emulsified in the aqueous shellac dispersion. The ammonium salt of the acid shellac is, as indicated, an excellent emulsifying agent. Hence, the addition of ammonium hydroxide or other similar base to the aqueous shellac dispersion ensures emulsification of the oil therewith.

The filler or pigment is not essential, although it gives better working properties to the finished product. It may be omitted if desired.

As examples of the procedure to produce compositions adapted to afford the desired results, the following are preferred, although many variations are possible:

1. Linseed oil _____ grams__ 200
   Ammonium hydroxide _____ cc__ 10
   Water _____ cc__ 300
2. Shellac _____ grams__ 40
   Ammonium hydroxide _____ cc__ 10
   Water _____ cc__ 200
3. Rhodamine B _____ grams__ 2
   Water _____ cc__ 200

Dispersions 1 and 2 and solution 3 are mixed as hereinbefore described and coagulated by the addition of an electrolyte.

If desired, the following may be added to the shellac dispersion:

4. Dioctyl phthalate _____ grams__ 60

As a filler, 200 grams more or less of a pigment or filler as described may be added to the mixture before coagulation.

Various changes may be made in the procedure as described without departing from the invention or sacrificing the advantages thereof.

I claim:

1. The method of preparing coating compositions which comprises mixing together an aqueous solution of a water-soluble organic dye, and aqueous dispersions of a drying oil and dewaxed shellac, adding an electrolyte to break the dispersions and transfer the dye and dispersed materials from the water to the oil phase, separating the water and drying the oil phase.

2. The method of preparing coating compositions which comprises mixing together an aqueous solution of a water-soluble organic dye, and aqueous dispersions of a drying oil, dewaxed shellac, and a filler or pigment, adding an electrolyte to break the dispersions and transfer the dye and dispersed materials from the water to the oil phase, separating the water and drying the oil phase.

3. The method of preparing coating compositions which comprises mixing together an aqueous solution of a water-soluble fluorescent organic dye, and aqueous dispersions of a drying oil and dewaxed shellac, adding an electrolyte to break the dispersions and transfer the dye and dispersed materials from the water to the oil phase, separating the water and drying the oil phase.

4. The method of preparing coating compositions which comprises mixing together an aqueous solution of a water-soluble fluorescent organic dye, and aqueous dispersions of a drying oil, dewaxed shellac and a filler or pigment, adding an electrolyte to break the dispersions and transfer the dye and dispersed materials from the water to the oil phase, separating the water and drying the oil phase.

5. The method of preparing coating compositions which comprises mixing together an aqueous solution of a water-soluble organic dye, and aqueous dispersions of linseed oil and dewaxed shellac, adding an electrolyte to break the dispersions and transfer the dye and dispersed materials from the water to the oil phase, separating the water and drying the oil phase.

References Cited in the file of this patent

UNITED STATES PATENTS

| Number | Name | Date |
| --- | --- | --- |
| Re. 12,812 | Hammer | Oct. 22, 1907 |
| 1,303,782 | Dugan | May 13, 1919 |
| 1,431,079 | Acheson | Oct. 3, 1922 |
| 1,431,080 | Acheson | Oct. 3, 1922 |